United States Patent [19]

Inoue

[11] Patent Number: 4,570,761
[45] Date of Patent: Feb. 18, 1986

[54] CABLING STRUCTURE OF PARKING CABLES FOR DRUM BRAKES

[75] Inventor: Takashi Inoue, Hanyu, Japan

[73] Assignee: Akebono Brake Industry Company Ltd., Tokyo, Japan

[21] Appl. No.: 630,267

[22] Filed: Jul. 12, 1984

[30] Foreign Application Priority Data

Jul. 18, 1983 [JP] Japan .............................. 58-110144[U]

[51] Int. Cl.$^4$ .............................................. F16D 51/22
[52] U.S. Cl. ....................................... 188/78; 74/89.2; 188/106 A
[58] Field of Search ................ 188/78, 79.5 P, 106 F, 188/106 R, 106 A, 325; 74/89.2, 89.21, 89.22

[56] References Cited

U.S. PATENT DOCUMENTS

| | | | |
|---|---|---|---|
| 2,672,057 | 3/1954 | Bratz | 74/89.22 X |
| 3,245,501 | 4/1966 | Dudley | 188/106 A |
| 3,292,741 | 12/1966 | Dombeck | 188/106 F X |

Primary Examiner—Duane A. Reger
Attorney, Agent, or Firm—Leydig, Voit & Mayer Ltd.

[57] ABSTRACT

Herein disclosed is a cabling structure of a parking cable for a drum brake which is equipped with a backing plate, a brake shoe and a parking lever. A pulley is hinged in a swinging manner to the backing plate or the brake shoe and is formed with two arcuate grooves having different radii measured from the hinging axis. First and second cables are hung in the two arcuate grooves, respectively, and are connected to a brake actuating mechanism and the parking lever, respectively. The direction of leading out the parking cable can be different from that of the force for pulling the parking lever without any breakage of the parking cable. The pulley may alternatively be formed with one arcuate groove. Then, the second cable connected to the parking lever is retained on the pulley such that it extends to partially contact with the first cable.

5 Claims, 7 Drawing Figures

CABLING STRUCTURE OF PARKING CABLES FOR DRUM BRAKES

BACKGROUND OF THE INVENTION

1. Field of the Invention

The present invention relates to a drum brake and, more particularly, to a cabling structure of a parking cable of the drum brake.

2. Description of the Prior Art

In the drum brake equipped with a parking brake of the prior art, a change of the direction of leading out the parking cable is conducted by guiding the single parking cable through a cable guide which is fixed on a backing plate or the like. This is accompanied by the slide or fold of the parking cable to cause a defect that the parking cable is liable to be broken. In view of the defect, there has been proposed a concept of changing the direction of leading out the parking cable by hinging a bell crank or a pulley to the backing plate.

However, the structure using the bell crank has a difficulty that the lever ratio fluctuates in accordance with the swinging motions of the bell crank when the parking brake is to be applied. On the other hand, the structure using the pulley, as disclosed in U.S. Pat. No. 3,245,501, has a difficulty that the lever ratio cannot be changed because a single parking cable is wound on the pulley.

SUMMARY OF THE INVENTION

In view of the difficulties of the prior art thus far described, therefore, the present invention has an object to eliminate those difficulties by hinging a pulley to a backing plate or the like and by cabling two separate parking cables on said pulley at a changed lever ratio.

According to one feature of the present invention, there is provided a cabling structure of a parking cable for a drum brake having a backing plate, a brake shoe and a parking lever, comprising: a pulley hinged to swing to the backing plate or the brake shoe of said drum brake and having two arcuate grooves having different radii measured from the hinging axis thereof; and first and second cables hung in the two arcuate grooves of said pulley, respectively, and connected to a brake actuating mechanism and said parking lever, respectively, so that the direction of leading out said parking cable may be different from that of the force for pulling said parking lever without any breakage of said parking cable.

BRIEF DESCRIPTION OF THE DRAWINGS

Other objects, features and advantages of the present invention will become apparent from the following description taken in conjunction with the accompanying drawings, in which.

DESCRIPTION OF THE PREFERRED EMBODIMENTS

The present invention will be described in the following in connection with the embodiments thereof with reference to the accompanying drawings.

Figure 1:
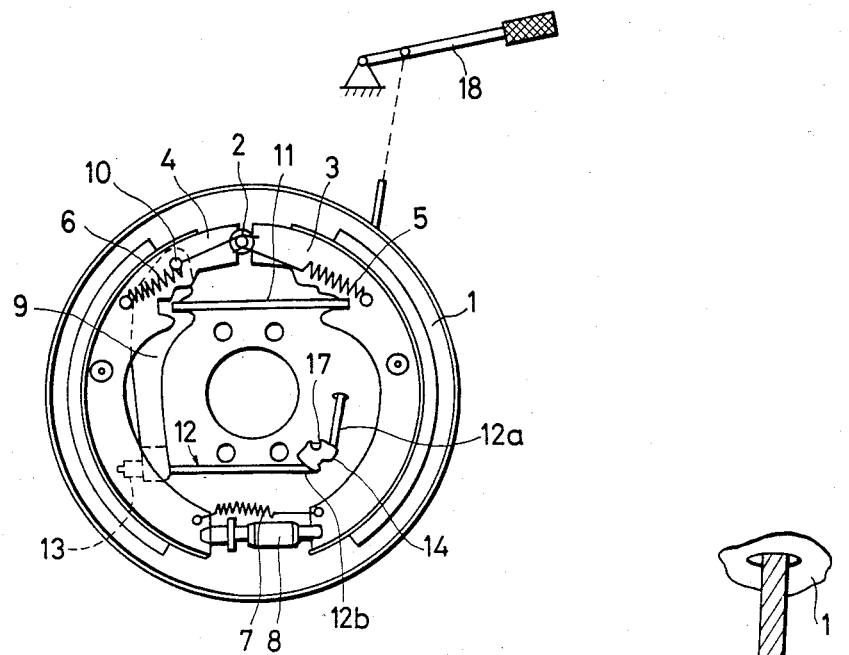
FIG. 1 is a front elevation showing one embodiment in which a cabling structure of a parking cable according to the present invention is applied to an internal expanding type parking brake.

FIG. 1 shows one embodiment in which the cabling structure of the parking cable according to the present invention is applied to an internal expanding type parking brake. In FIG. 1: reference numeral 1 indicates a backing plate; numeral 2 an anchor pin; numerals 3 and 4 brake shoes; numerals 5 and 6 shoe return springs; numeral 7 a brake shoe return spring; numeral 8 a clearance adjustor; numeral 9 a parking lever which has its one end portion hinged in a swinging manner to the brake shoe 4 by means of a pin 10; and numeral 11 a strut.

Figure 2:
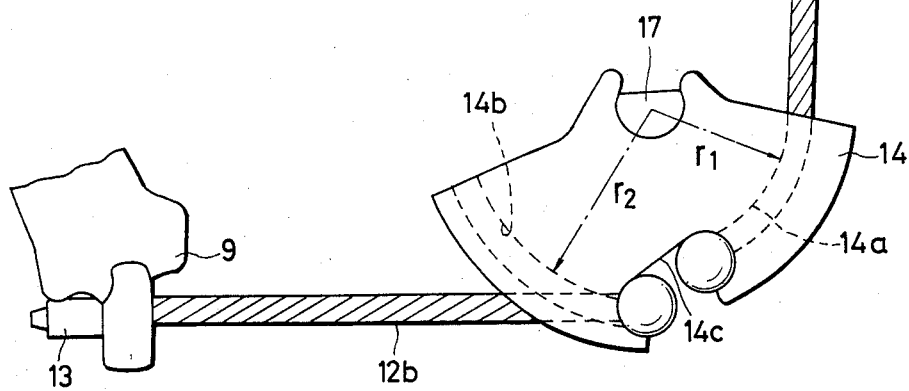
FIG. 2 is a front elevation showing an essential portion of the same in an enlarged scale.
Figure 3:
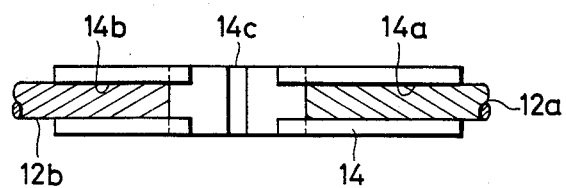
FIG. 3 is a bottom view showing a pulley.

A parking cable 12 is divided into two portions, i.e., a first cable 12a which extends to the outside of the backing plate 1 until it is connected to a brake actuating mechanism disposed near a driver's seat, e.g., a not-shown brake lever, and a second cable which is connected to the other end portion of the parking lever 9 by means of a nipple 13. Indicated at numeral 14 is a sector pulley which is hinged in a swinging manner to the backing plate 1 by means of a pin 17. The sector pulley 14 is formed, as shown in FIGS. 2 and 3, with two arcuate grooves 14a and 14b which are located in the same circumferential direction and which have different radii $r_1$ and $r_2$ measured from the hinging axis of the pin 17. In the notch 14c formed at the inner end portions of the two grooves 14a and 14b, there are retained such cable ends of the first and second cables 12a and 12b as are expanded. And, the first cable 12a is hung in the groove 14a having a smaller radius whereas the second cable 12b is hung in the groove 14b having a larger radius, thus completing the cabling operation.

Figure 4:
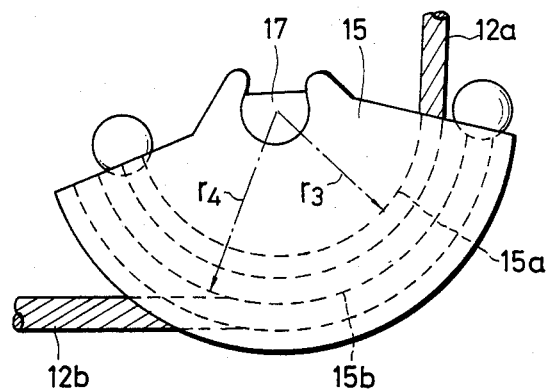
FIG. 4 is a front elevation showing another example of the construction of the pulley.
Figure 5:
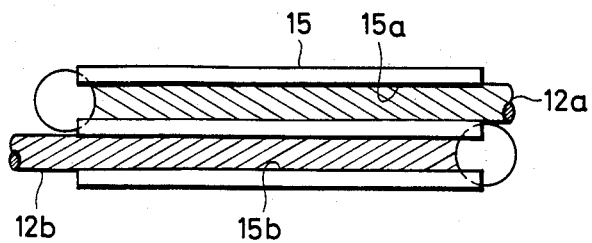
FIG. 5 is a bottom view showing the same.

The grooves of the sector pulley may be modified, as shown in FIGS. 4 and 5. A sector pulley 15 is formed with a smaller arcuate groove 15a having a radius $r_3$ and a larger arcuate groove 15b having a radius $r_4$. These arcuate grooves 15a and 15b are located in the circumference but are offset in the axial direction of the pin 17. The first cable 12a is hung in the smaller groove 15a whereas the second cable 12b is hung in the larger groove 15b. The ends of the individual cables 12a and 12b are retained on the side of the sector pulley 15.

Figure 6:
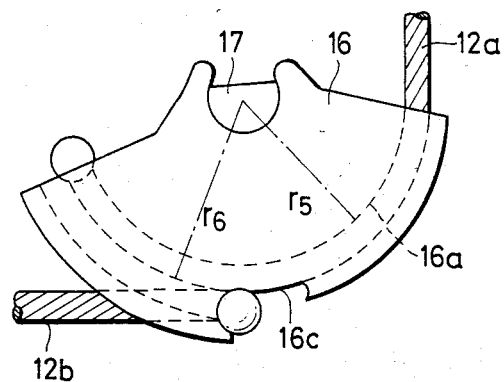
FIG. 6 is a front elevation showing still another example of the pulley.
Figure 7:
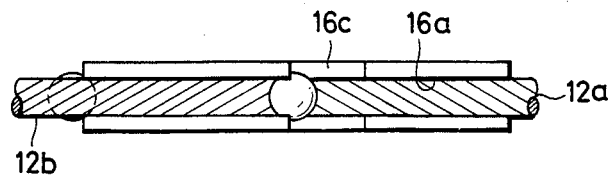
FIG. 7 is a bottom view showing the same.

In another modification, as shown in FIGS. 6 and 7, a sector pulley 16 is formed in an identical circumference with one deep arcuate groove 16a, which has a radius $r_5$ on the hinging axis 17, and at its central portion with a notch 16c. The cabling operation may be conducted such that the first cable 12a has its cable end retained on the end portion of the groove 16a and is hung in the groove 16a whereas the second cable 12b has its cable end retained in the notch 16c and extends with a larger radius $r_6$ to partially contact with the first cable 12a.

According to the cabling structure of the parking cable thus far described, the direction of leading out the parking cable 12 can be changed by the pulley 14, 15 or 16, and the pulling force to be applied to the first cable 12a by actuating the not-shown brake lever acting as the brake actuating mechanism can be promptly transmitted to the second cable 12b if the ratio $r_2/r_1$, $r_4/r_3$ or $r_6/r_5$ is made larger than 1. This pulling force can also be enlarged and transmitted to the second cable 12b if the lever ratio $r_2/r_1$, $r_4/r_3$ or $r_6/r_5$ is made smaller than 1. Incidentally, the hinging point of the pulley 14, 15 and 16 by the pin 17 should not be limited to the backing plate 1 but may be located at the brake shoe 3. Moreover, the present invention can find wide applications such as the cabling structure of the parking cable for a leading-trailing brake equipped with the parking brake.

One of the practical effects is to enjoy the characteristics of the pulley such that the direction of leading out the parking cable can be changed while the input to the parking lever by the brake actuating mechanism being kept constant at all times during the actuation of the brake actuating mechanism. Another effect is that the lever ratio can be suitably set by the pulley used so that the stable braking action of the parking brake can be expected by changing the force for pulling the parking lever.

What is claimed is:

1. A cabling structure of a parking cable for a brake mechanism including a drum brake having a backing plate, a brake shoe and a parking lever, comprising:

means for increasing mechanical advantage in the cabling structure between the parking lever and the brake shoe including a pulley supported by said brake mechanism for swinging movement about an axis and having two arcuate grooves having different radii measured from said axis thereof; and first and second independent cables slidably received in the two arcuate grooves of said pulley, respectively, and having terminal ends releasably connected to said pulley and cable portions extending to said brake actuating mechanism and said parking lever, respectively, so that the direction of leading out said parking cable may be different from the direction of leading in said parking cable to the pulley.

2. A cabling structure according to claim 1 wherein one of said grooves has an effective radius smaller than that of the other for a smaller diameter cable.

3. A cabling structure according to claim 1 wherein said two grooves are formed in a common plane.

4. A cabling structure according to claim 1 wherein said two grooves are offset from each other with respect to the direction of the axis of said pulley.

5. A cabling structure of a parking cable for a brake actuating mechanism including a drum brake having a backing plate, a brake shoe and a parking lever, comprising:

means for increasing mechanical advantage in the cabling structure between the parking lever and the brake shoe including a pulley supported by said brake mechanism for swinging movement about an axis and having a pair of concentric arcuate grooves;

a first cable connected to said brake actuating mechanism and slidably received in one of said grooves of said pulley and having a terminal end releasably connected to said pulley; and a second cable independent from said first cable having a terminal end releasably connected to said pulley and a cable portion connected to said parking lever and retained in a second arcuate groove of said pulley such that it extends to partially contact with said first cable, so that the direction of leading out said parking cable may be different from the direction of leading in said parking cable to said pulley.

* * * * *